United States Patent [19]

Coppier

[11] Patent Number: 5,345,667
[45] Date of Patent: Sep. 13, 1994

[54] PROCESS FOR MODIFYING THE CHARACTERISTICS OF A METAL SURFACE

[75] Inventor: Michel Coppier, Rumilly, France

[73] Assignee: Seb S.A., Selongey, France

[21] Appl. No.: 91,882

[22] Filed: Jul. 15, 1993

[30] Foreign Application Priority Data

Jul. 24, 1992 [FR] France ............... 92 09160

[51] Int. Cl.⁵ ............................................. B21K 25/00
[52] U.S. Cl. ........................................ 29/505; 29/904; 29/DIG. 37
[58] Field of Search ............ 29/163.6, 505, 521, 29/904, DIG. 37, 514

[56] References Cited

U.S. PATENT DOCUMENTS

| | | | |
|---|---|---|---|
| 2,050,993 | 8/1936 | Bush | 29/521 |
| 3,100,340 | 8/1963 | Goepfrich. | |
| 3,100,930 | 8/1963 | Nihlen et al. | 29/521 |
| 3,831,258 | 8/1974 | Elbert et al. | 29/163.6 |
| 5,079,825 | 1/1992 | Matsui et al. | 29/521 |
| 5,121,537 | 6/1992 | Matsui et al. | 29/521 |

FOREIGN PATENT DOCUMENTS 3728037 3/1989 Fed. Rep. of Germany.
9111901.4 12/1991 Fed. Rep. of Germany.
2302174 9/1976 France.

Primary Examiner—Mark Rosenbaum
Assistant Examiner—David P. Bryant
Attorney, Agent, or Firm—Young & Thompson

[57] ABSTRACT

The invention relates to a process for modifying the characteristics of a metal (2) surface (1), by application to the surface (1) of a perforated sheet (3) of another metal (4), the perforated sheet (3) having to be secured onto the surface (1) by die stamping. According to the invention the perforated sheet (3) is shaped so that each perforation (6) has a lip (5) and a lip end (7); the sheet (3) thus shaped is applied to the surface (1), the lips (5) of the perforations (6) forming protuberances directed towards the surface (1); the shaped sheet (3) is crimped by die stamping onto the surface (1), the straightening of the lips (5) and of the lip ends (7) which is associated with the flow of material (2) of the surface (1) into the perforations (6) producing a reliable anchorage of the sheet on the surface.

15 Claims, 1 Drawing Sheet

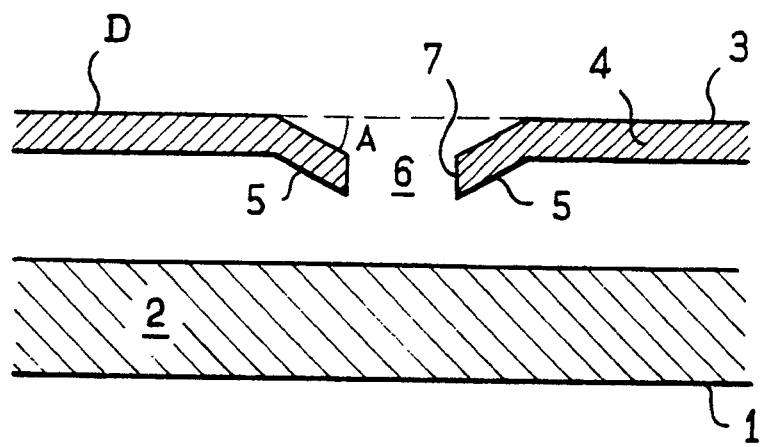
FIG_1
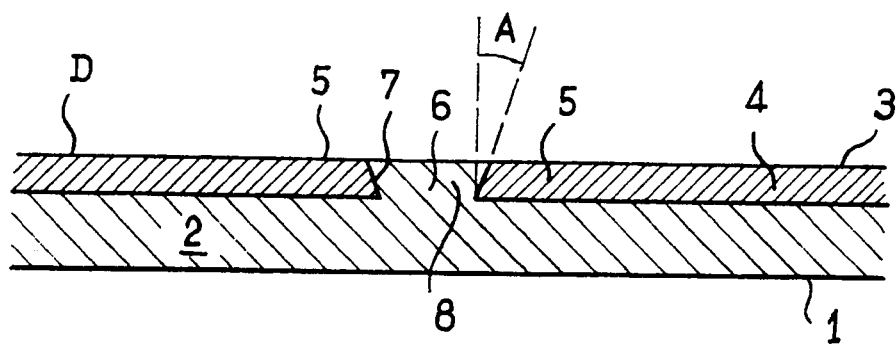
FIG_2
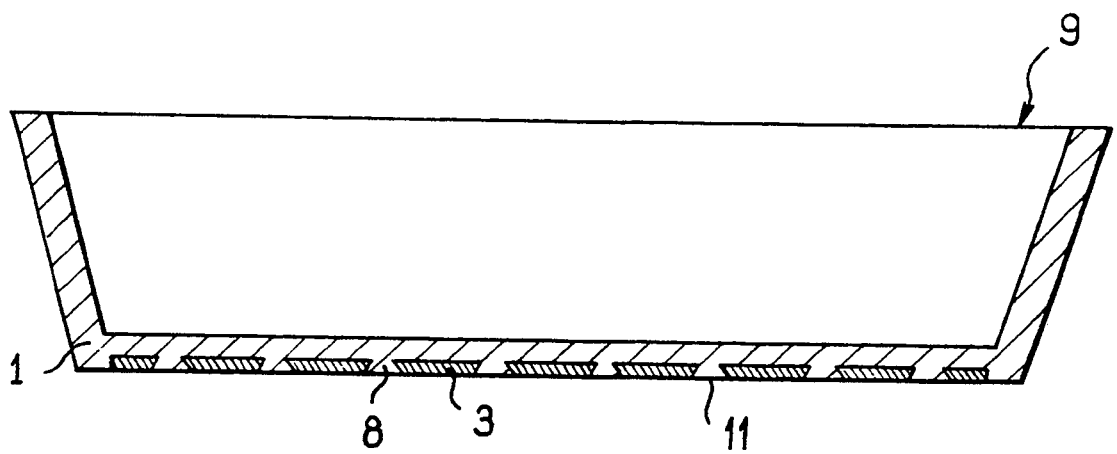
FIG_3
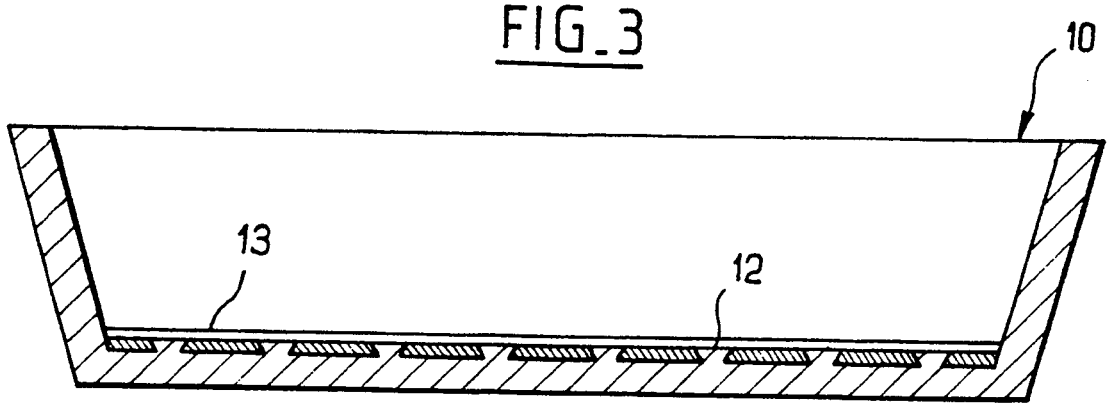
FIG_4

5,345,667

PROCESS FOR MODIFYING THE CHARACTERISTICS OF A METAL SURFACE

FIELD OF THE INVENTION

The present invention relates to a process for modifying the characteristics of a surface of a metal.

The invention also relates to the articles produced from a plate of metal whose characteristics have been modified in accordance with the invention. In one of the applications of the invention these articles are cooking containers.

BACKGROUND OF THE INVENTION

Aluminum is a metal which offers numerous advantages. It is light, capable of being easily drawn and die-stamped and conducts heat well. In addition, it is relatively economical. Because of these properties it is universally employed in industry, especially for producing cooking containers. However, it has drawbacks. First of all it is relatively soft, with the result that its surface is easily scratched. In household applications aluminum is frequently coated with a nonstick layer such as polytetrafluoroethylene or with a layer of enamel. However, the lifetime of these coatings is limited because aluminum is a substrate which is too soft. Furthermore, articles made of aluminum and in particular cooking containers tend to distort easily under the effect of the heat generated, for example, by an electric cooking plate or a gas burner.

To overcome this difficulty it is possible either to increase the thickness of the metal or to apply a sheet of stainless Steel to the aluminum wall, for example by hot stamping. However, in this case the cost of manufacture is appreciably increased and the heat conductivity is reduced, lengthening the cooking times.

Finally, aluminum utensils cannot be heated by induction, since this method of heating requires the use of containers made of magnetic metal such as ferritic stainless steel.

There are processes which make it possible to modify economically the characteristics of the surface of a metal. One such process consists in applying to the surface of the metal a grid of another metal, this grid being secured by die stamping. The grid may have all kinds of wire meshes, square ones, rectangular ones, hexagonal ones or others. It can also take the form of a planar sheet of perforated metal.

In the case of a perforated planar sheet the disadvantage arises from its lack of true anchorage in the surface material. In a shorter or longer term this could eventually give rise to a debonding of the sheet.

SUMMARY OF THE INVENTION

The objective of the present invention is to overcome a possible debonding by providing a process which makes it possible to produce a reliable anchorage of the sheet on the surface.

To this end, a process is provided for modifying the characteristics of a metal surface by application to said surface of a perforated sheet of another metal, the perforated sheet having to be secured onto the surface by die stamping.

According to the invention the perforated sheet is shaped so that each perforation has a lip and a lip end; the sheet thus shaped is applied to the surface, the lips of the perforations forming protuberances directed towards the surface;

the shaped sheet is crimped by die stamping onto the surface, the straightening of the lips and of the lip ends which is associated with the flow of material of the surface into the perforations producing a reliable anchoring of the sheet on the surface.

A composite surface is thus obtained made up of two layers of different metals associated with one another, on the one hand, by the die stamping and, on the other hand, by reliable points of anchorage.

The invention also relates to articles produced by this process, in particular to cooking containers.

BRIEF DESCRIPTION OF THE DRAWINGS

Other characteristics of the invention will appear from the description below, with reference to the drawings which are given by way of examples—no limitation being implied—in which:

FIG. 1 is a diagrammatic sectional view of a metal plate and of a perforated shaped sheet before die stamping, in a preferred embodiment of the invention;

FIG. 2 is a diagrammatic sectional view of the whole of FIG. 1 after die stamping;

FIG. 3 is a diagrammatic sectional view of a cooking container according to a preferred embodiment of the invention;

FIG. 4 is a diagrammatic sectional view of a cooking container according to another embodiment of the invention.

DETAILED DESCRIPTION OF THE INVENTION

The first stage of the process according to the invention consists in shaping a perforated sheet 3 of metal 4 so that each perforation 6 has a lip 5 and a lip end 7. In the preferred embodiment of the invention each lip 5 forms an angle A with the plane D of sheet 3 and has a lip end 7 perpendicular to the plane D of the sheet 3. The next stage consists in applying the sheet 3 thus shaped to a surface 1 of metal 2 so that the lips 5 form protuberances directed towards the surface 1. The last stage consists in performing the die stamping thus producing the crimping of the sheet 3 onto the surface 1, the straightening of the lips 5 and of the lip ends 7 which is associated with the flow of material 2 of the surface 1 into the perforations 6 producing a reliable anchorage 8 of the sheet 3 on the surface 1. In the preferred embodiment of the invention the lip ends 7, when being straightened, produce a bevel of angle A with the perpendicular to the plane D of the sheet 3, thereby forming, with the flowing material 2 of the surface 1 a reliable dovetail-shaped anchorage 8.

The relatively soft preferred metal 2 of the surface 1 is aluminum.

The metal 2 may, however, also be copper, tin, lead or an alloy of one or more of these metals, or any other metal or alloy.

The sheet 3 may thus be made of magnetic stainless steel.

The sheet 3 embedded into the bottom of a container 9 (FIG. 3) gives the latter the following technical advantages:

a) hardening of the bottom of the container, which enables the latter to better withstand wear, b) improvement in the resistance of the bottom to distortions generated by temperature variations; as a result, the bottom remains flat and heat transfer with a cooking plate remains optimal, c) the container can be heated by induction, by virtue of the presence of the magnetic steel, d) since aluminum is an excellent heat conductor, the heat stored by the stainless steel of the sheet flows well and uniformly through the aluminum bottom 11, e) since the stainless steel sheet is noncontinuous, it is possible to adjust the flow of heat through the bottom of the container to a low value and consequently to avoid abrupt and excessive heating of the foodstuffs, f) the presence of a grid has only a small effect on the cost of manufacture and does not in any way interfere with the drawing of the aluminum containers.

Consequently, the above cooking container exhibits all the advantages due to the use of aluminum while having the advantages brought about by the stainless steel sheet.

If the possibility of induction heating is not required, the sheet may be made of nonmagnetic, austenitic (18/8 type) stainless steel or any other metal which is harder than aluminum.

FIG. 4 shows another cooking container 10 made of aluminum, the bottom 12 of which has on its inner face a sheet 3, for example made of stainless steel or other relatively hard steel.

In this example a nonstick coating 13, for example of polytetrafluoroethylene, covers the internal surface of the bottom 12 as well as the sheet 3.

Of course, the invention is not limited to the examples of embodiment just described and many modifications can be made to the latter without departing from the scope of the invention.

Thus, the invention is applicable to fields other than the manufacture of cooking utensils. It can, in fact, be applied to any technical field where it is desired to modify the properties of the surface of a metal of any kind by embedding a sheet made of another metal onto it.

What is claimed is:

1. A process for modifying a flat metal surface by application to said surface of a perforated metal sheet of another metal, said process comprising the following steps:

shaping said perforated sheet so that each perforation has a lip and a lip end on one side of said sheet;

applying said one side of said sheet thus shaped to said surface, with said lips of said perforations being directed towards said surface; and die stamping said shaped sheet onto said surface such that the lip ends penetrate the surface and the lips become straightened to form a planar perforated sheet engaged with said surface, and wherein, during said straightening, material from said surface is forced into the perforations, thereby anchoring said sheet to said surface.

2. The process as claimed in claim 1, wherein during the shaping step, the lips are shaped so that they form an angle (A) with the plane (D) of the sheet and (A) they have lip ends (A) perpendicular to said plane (D) of the sheet.

3. The process as claimed in claim 2, wherein during the die stamping step, after the lips have become straightened, the lip ends form a bevel of angle (A) with the perpendicular to said plane (D) of the sheet, and thereby form, in combination with said material of said surface, a reliable dovetail-shaped anchorage.

4. The process as claimed in claim 1 wherein the sheet is made of a metal which is harder than that of said surface.

5. The process as claimed in claim 1, wherein the metal of said surface is selected from the group consisting of aluminum, copper, tin, lead, and an alloy of one or more of these metals.

6. The process as claimed in claim 1, wherein the sheet is made of ferrous metal or an alloy which has magnetic properties.

7. The process as claimed in claim 6, wherein the sheet is made of stainless steel.

8. The process as claimed in claim 1, wherein the die stamping is performed by stamping.

9. The process as claimed in claim 1, wherein the die stamping is performed by rolling.

10. The process as claimed in claim 1, wherein said surface is a face of an article produced from a plate of relatively soft metal, the metal of said perforated sheet being harder than that of the plate.

11. The process as claimed in claim 10, wherein the article is a cooking container.

12. The process as claimed in claim 11, wherein the perforated sheet is applied and secured onto the external surface of the bottom of the container.

13. The process s claimed in claim 12, wherein the container is produced by drawing a plate of aluminum and the sheet is made of ferritic stainless steel.

14. The process as claimed in claim 11, wherein the perforated sheet is applied and secured onto the internal surface of the bottom of the container.

15. The process as claimed in claim 14, wherein the sheet and said internal surface are covered by a nonstick coating.

* * * * *